UNITED STATES PATENT OFFICE.

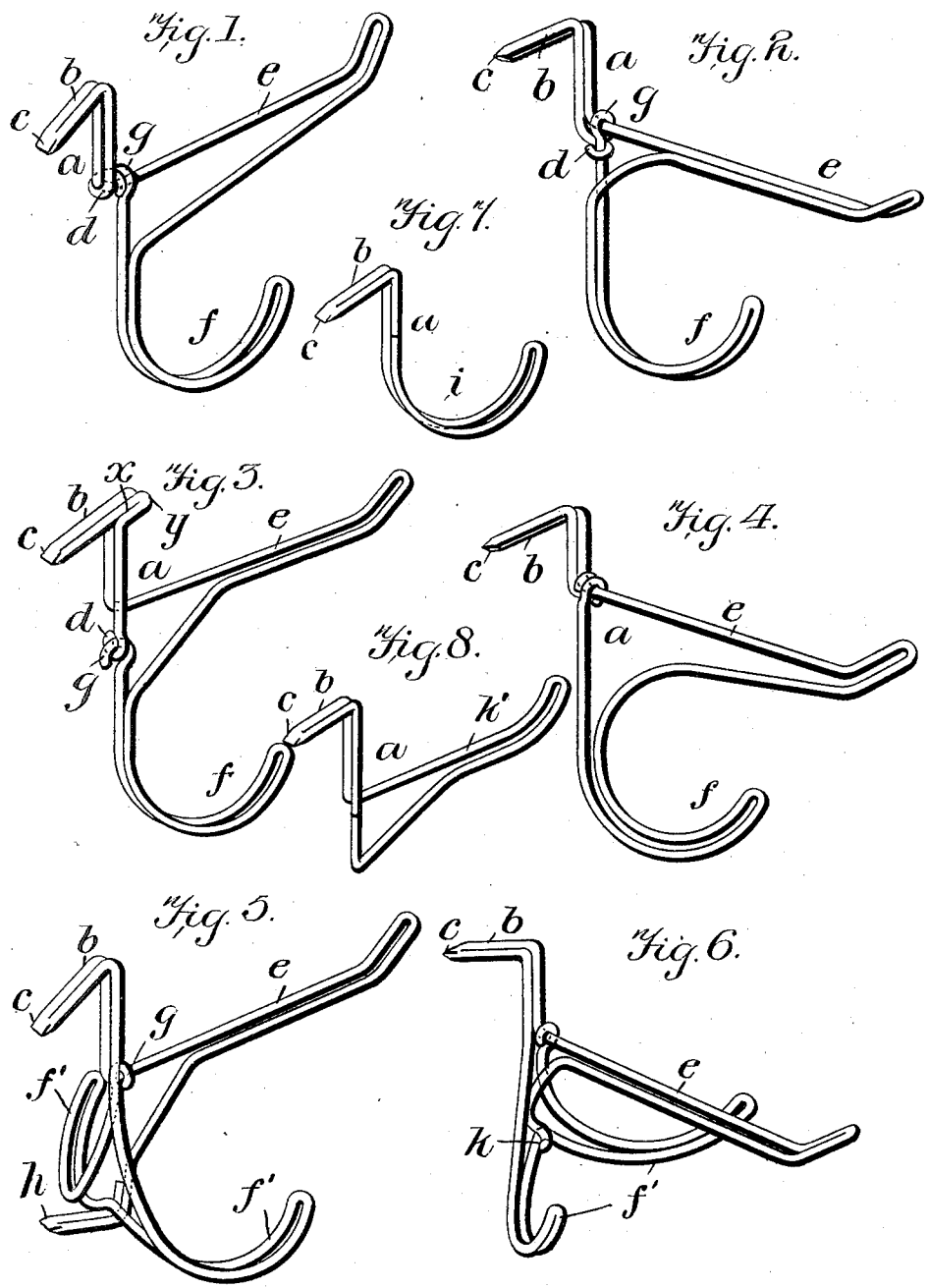

ALPHONSO H. COBB, OF ASHEVILLE, NORTH CAROLINA.

CLOTHES-HOOK.

SPECIFICATION forming part of Letters Patent No. 707,824, dated August 26, 1902.

Application filed January 14, 1902. Serial No. 89,761. (No model.)

*To all whom it may concern:*

Be it known that I, ALPHONSO H. COBB, a citizen of the United States, residing at Asheville, in county of Buncombe and State of North Carolina, have invented certain new and useful Improvements in Clothes-Hooks; and I do hereby declare the following to be a full, clear, and exact description of the invention, such as will enable others skilled in the art to which it appertains to make and use the same.

My present invention relates to improvements in hooks such as are commonly employed in hanging clothes or other articles of apparel.

My said invention possesses certain features of novelty that will hereinafter more fully appear, reference being had to the accompanying drawings, wherein—

Figure 1 is a perspective view of one form of my hook. Fig. 2 is a similar view of a slightly-modified form of hook. Fig. 3 shows a third form of my invention. Fig. 4 is a perspective view of another form of my invention. Fig. 5 is a perspective view of my invention applied to a double hook, and Fig. 6 is a modified form of the same. Figs. 7 and 8 show the invention applied to single hooks.

Referring first to the form of hook shown in Fig. 1, $a$ represents the wire of one piece, of which the hook is made. This wire is first bent double upon itself, forming the angular portion or extension $b$, said portion being bent back preferably at an angle less than a right angle to give the same a downward direction. Upon the end of this extension $b$ where the wire bends upon itself a chisel-point $c$ is formed in any suitable manner, such as by swaging. The short free end of this wire $a$ is twisted around upon the longer portion at the point $d$. This longer end is then bent out to form the upper hook $e$ and then the lower hook $f$, and the end is finally wound around the upper portion of the hook at $g$ adjacent to the end $d$. In this form of the hook in forming the upper hook the wire is brought back preferably beneath the upper wire to reinforce the same, the two wires in the hook $f$ being side by side.

In Fig. 2 the hook portion or extension $b$ and the point $c$ are formed in substantially the same manner as in Fig. 1; but the end $d$ is bent around the other end of the wire $g$, which is wound around the wire forming the hook $e$, a lock-joint being thereby formed. Instead of forming the hook $e$ with one wire beneath the other, as in Fig. 1, the two wires are placed parallel.

In Fig. 3 the hook is provided with the portion $b$ and point $c$, as in Figs. 1 and 2; but at the point $x$ the portion $b$ is bent back upon itself, forming the head $y$, adapted to receive the blow of a hammer or the like. The body portion of this form of the hook is formed in substantially the same manner as the hook in Fig. 2, except that the ends $d$ and $g$ are simply hooked together, as shown.

The form of hook shown in Fig. 4 is substantially the same as that shown in Fig. 1, except that instead of the upper hook $e$ alone being formed with one wire bent beneath the other the lower hook $f$ is formed in the same manner.

The double forms of hook are shown in Figs. 5 and 6. In Fig. 5 the portion $b$ and the chisel-point $c$ are made as in Figs. 1 to 4, and the upper hook $e$ is formed in the same manner as in Figs. 2 and 3; but one end of the wire which forms the hook $e$ is bent downwardly and forms the chisel-point $h$, pointing rearwardly and upwardly. The other end of the wire is bent down from the portion $b$ and forms the two lower hooks $f'$ and $f'$, finally terminating in the end $g$, which is secured to the portion of the wire forming the hook $e$. The hook shown in Fig. 6 is formed in substantially the same manner as the hook shown in Fig. 5; but the point $h$ is omitted, this end of the wire instead being bent upon the portion $k$ of the lower hooks $f'$ $f'$.

In securing these hooks in place it will be seen that the ordinary screws as commonly employed are entirely dispensed with, a hammer being the only tool required in securing them in place.

An important feature in these hooks is the manner of forming the portion $b$ and points $c$. By doubling the wire upon itself in forming the portion $b$ a much stronger point is formed, eliminating all possibilities of bending in driving and also preventing twisting of the hook while in position due to lateral strains which may be brought to bear, both common faults of this class of hooks, in which the point is formed of a single thickness of wire.

In the hooks shown in Figs. 7 and 8 instead of employing an upper and lower hook upon the same hook only one of such hooks is employed. In Fig. 7 the portion b, carrying the point c, formed by the doubling of the wire is made as in the preceding figures, the remaining portion of the wire being bent into a loop forming the hook i. In Fig. 8 the portion b, provided with the pointed end c, is formed in the same manner as in Fig. 7, but instead of bending the remaining portion of the wire into a loop to form the hook i the same is bent out to form the hook k', similar to the upper hook employed in the double hooks hereinbefore described.

In the construction illustrated by Figs. 7 and 8 the two ends of the wire can be secured in any suitable way—for instance, they may be soldered together and to the body portion of the hook—or in the construction shown in Fig. 7 a connection somewhat similar to the connection shown in Fig. 3 might be used, and in Fig. 8 any of the methods of securing the ends of the wire shown in the preceding figures might be used.

Many changes might suggest themselves to any one skilled in the art, which changes might be made without departing from the spirit of my invention. Therefore I do not limit myself to the precise constructions shown.

Having thus described my invention, what I claim as new, and desire to secure by Letters Patent of the United States, is—

1. A hook comprising a single piece of wire bent to the desired form, and provided with a fastening device formed by one end of the wire being bent rearwardly and doubled back upon itself and secured, said doubled extension being sharpened at its looped end.

2. A hook comprising a single piece of wire bent to the desired form and provided with a fastening device comprising a reinforced looped extension formed by one end of said wire being bent upwardly and rearwardly and doubled back upon itself and secured, said reinforced extension being sharpened at its looped end.

3. A hook of the character described, composed of one piece of wire having a body portion comprising the upper and lower hooks, a downwardly-projecting looped extension carried by the hook, formed by the wire being bent upon itself and secured to the body portion of the hook, and a chisel-point formed upon the end of said looped extension.

4. A device of the character described comprising a single piece of wire bent to form a plurality of hooks forming the body portion of the device, and a fastening extension formed by one end of the wire being bent rearwardly at an angle to said body portion and doubled back upon itself and secured to the body portion, said extension being sharpened at its looped end.

5. A device of the character described comprising a single piece of wire bent to form a plurality of hooks and a plurality of rearwardly-projecting looped extensions, said extensions being sharpened at their looped ends and adapted to be driven into a support.

In testimony whereof I affix my signature in presence of two witnesses.

ALPHONSO H. COBB.

Witnesses:
S. C. DUKES,
E. C. McDOWELL.